United States Patent

[11] 3,630,085

| [72] | Inventors | John E. Roney<br>Monroeville;<br>Donald M. Gerstner, Pittsburgh, both of Pa. |
|---|---|---|
| [21] | Appl. No. | 8,471 |
| [22] | Filed | Feb. 4, 1970 |
| [45] | Patented | Dec. 28, 1971 |
| [73] | Assignee | Jones & Laughlin Steel Corporation<br>Pittsburgh, Pa. |

[54] APPARATUS FOR MEASURING TEMPERATURES
2 Claims, 1 Drawing Fig.

[52] U.S. Cl............................................................. 73/355 EM
[51] Int. Cl......................................................... G01j 5/52,
G01j 5/62
[50] Field of Search........................................... 73/355, 355 EM

[56] References Cited
UNITED STATES PATENTS

| 2,690,078 | 9/1954 | Phillips........................ | 73/355 EM |
| 2,737,809 | 3/1956 | Fastie........................... | 73/355 EM |
| 2,837,917 | 6/1958 | Machler....................... | 73/355 EM |
| 3,465,589 | 9/1969 | Flook............................ | 73/355 R |

Primary Examiner—Louis R. Prince
Assistant Examiner—Frederick Shoon
Attorneys—T. A. Zalenski and G. R. Harris ABSTRACT: A body having a reflective surface whose temperature is adjustable is placed at an angle to a moving strand, such as steel strip, whose temperature is to be measured to form a wedge-shaped confined space which acts as a black body when the strand and body are at the same temperature. A radiant energy detector means alternately measures the radiant energy incident from a point on the reflective surface and from a point on the strand within the confined space and provides an electrical output which is a measure of the difference in the radiant energies incident from those points. This output is used to adjust the temperature of the body to the temperature of the strand whereby the strand temperature can be ascertained by direct measurement of the temperature of the body.

PATENTED DEC 28 1971 3,630,085
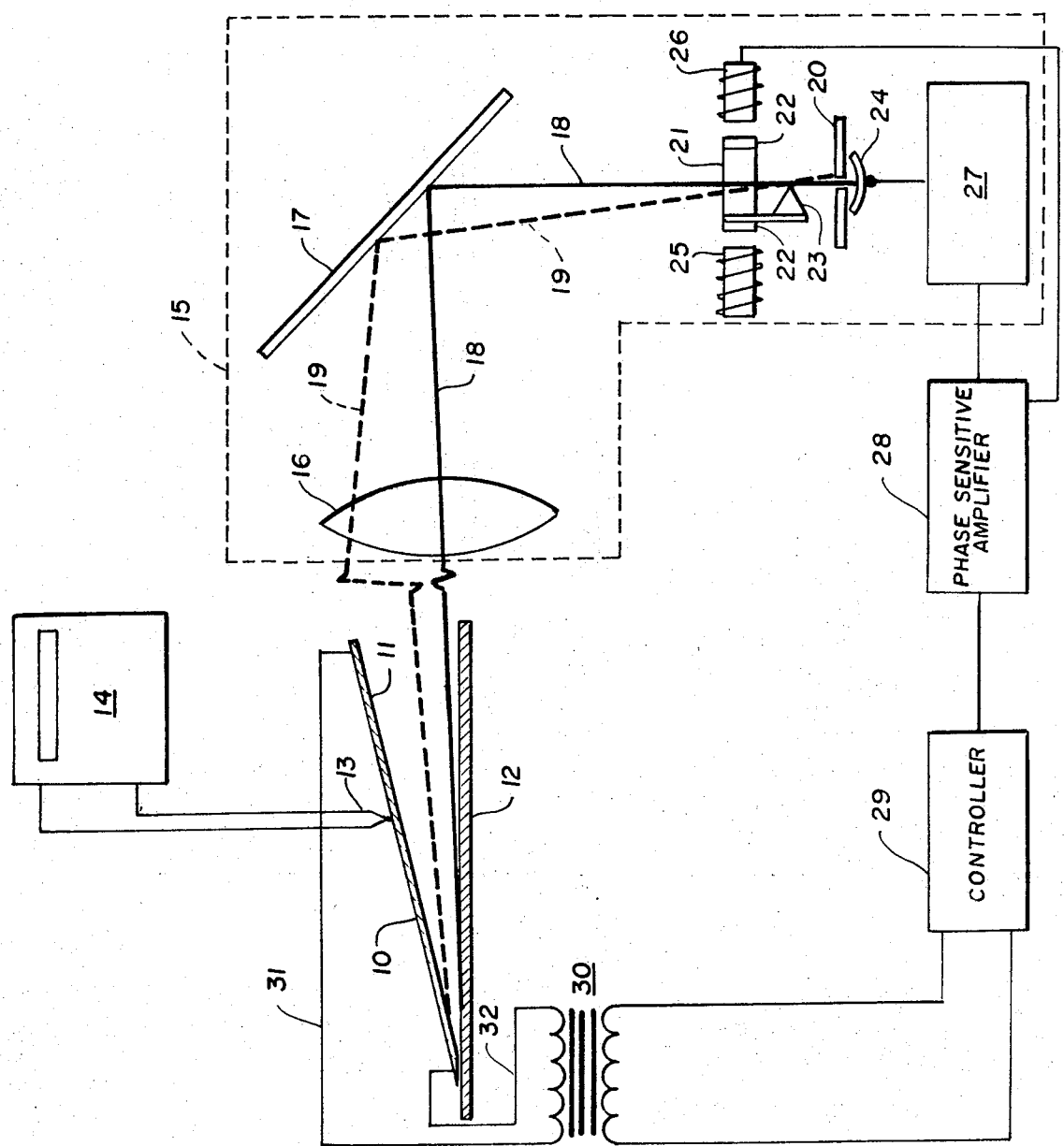
INVENTORS
JOHN E. RONEY and
DONALD M. GERSTNER
BY
their ATTORNEY

APPARATUS FOR MEASURING TEMPERATURES

This invention relates generally to temperature measuring apparatus and, more particularly, to temperature measuring apparatus for accurately measuring the temperature of a continuous strand notwithstanding variations in the emissivity of the surface of the strand.

In processing continuous strand material, such as heated steel strip, it is often important to know the exact temperature of the material and it is customary for that purpose to use temperature-measuring instruments which determine temperature by measuring the radiant energy incident from the material. Because the emissivity of such material frequently changes throughout its length so as to vary the radiant energy emitted therefrom independently of temperature changes in the strand, the emissivity changes must be compensated for in some manner; otherwise, the temperature measurement will be in error.

According to the present invention, a body having a reflective surface is positioned at an angle to a continuous strand to define a wedge-shaped confined space which acts as a black body when the strand and body are at the same temperature. Means are provided for heating the body. A radiant energy detector means alternately measures the radiant energy incident from a point on the reflective surface and from a point on the strand, both within the confined space, and provides an electrical output which is a measure of the difference in the radiant energies emitted by those points. The radiant energy detector means employs a single stationary photoelectric cell or radiation detector whose field of radiation reception is rapidly oscillated between the point on the strand and the point on the reflective surface. The output of the radiant energy detector means is used to control the means for heating the body so as to adjust the temperature of the body to the temperature of the strand. When the body is brought to the temperature of the strand the wedge-shaped confined space acts as a black body and, therefore, the radiant energy incident from the reflective surface and the strand within the confined space are the same. At such time, the output of the radiant energy detector means acts to maintain the temperature of the body at the strip temperature. A thermocouple attached to the body and to a suitable temperature indicator provides an indication of the temperature of the body and, consequently, when the body and strand are at the same temperature, of the temperature of the strand.

Thus, an object of the present invention is to provide apparatus for accurately measuring the temperature of a continuous strand, notwithstanding variations in the emissivity of the strand. Another object of the invention is to provide such apparatus wherein the difference in radiation incident from a point on the strand and from a point on a reflective surface of a body forming a wedge-shaped confined space with the strand is used as a reference to control the temperature of the body and adjust and maintain that temperature to and at the strand temperature whereby the strand temperature may be ascertained by a direct measurement of the body temperature. Still another object of the invention is to provide such apparatus wherein the radiation incident from a point on the strand and from a point on the reflective surface is sensed by a single stationary photoelectric cell whose field of radiation reception is rapidly oscillated between those two points.

These and other objects and advantages of the present invention will become more apparent from the following detailed description of the invention with reference to the figure of the drawing which is a diagrammatic illustration of an embodiment of the invention presently preferred by us.

A steel sheet or body 10 is polished on one side so as to have a reflective surface 11 which is positioned at an angle to a continuous strand 12, such as heated steel strip, whose temperature is to be measured. The steel sheet cooperates with the strand to define a wedge-shaped confined space which acts as a black body when the sheet and the strand are at the same temperature. A thermocouple 13 attached to the steel sheet measures its temperature and the temperature is indicated on a suitable recorder 14.

A radiant energy detector means 15 senses the radiant energy incident from a point on the reflective surface 11 and the radiant energy incident from a point on strand 12 within the wedge-shaped confined space and provides an electrical output measurably responsive to the difference in the radiant energies incident from those points. Lens 16 of the detector means 15 focuses the radiant energy emitted from a point on the strand 12 to a mirror 17 along a path 18 from where it is reflected to stationary photoelectric cell or radiation detector 24, through an aperture in shield 20. Lens 16 also focuses the radiant energy incident from a point on the reflective surface 11 to mirror 17 along a path 19 from where it is reflected to fall on shield 20.

A tuning fork 21 is positioned between shield 20 and mirror 17 such that the paths 18 ans 19 pass between the prongs 22—22 of the tuning fork. A quartz prism 23 is mounted on one of the tuning fork prongs so as to be adjacent but outside optical paths 18 and 19 when the tuning fork is at rest and alternately outside and across the paths when the tuning fork is vibrating. When the prism is across paths 18 and 19 the radiant energy traveling along path 18 is refracted by the prism so as to fall on shield 20 while the radiant energy traveling along path 19 is refracted by the prism so as to pass through the aperture in the shield and fall on photoelectric cell 24. Prism 23 and tuning fork 21 thus act as radiant energy refracting means to rapidly oscillate the field of radiation reception of cell 24 between a point on the steel strip 12 and a point on the reflective surface 11. Electromagnetic coil 25 is used to vibrate tuning fork 21 at its natural frequency, e.g., 500 c.p.s. Thus, the radiant energy incident from a point on the reflective surface and from a point on the strand within the confined space is sensed by a single photoelectric cell whose field of radiation reception is rapidly oscillated between those two points.

The electric current developed by cell 24 is delivered to electrical circuit 27 which provides an alternating current signal the magnitude of which is related to the difference in the radiant energies incident from the point on the reflective surface and the point on the strand. The magnitude of this signal is given by the following formula:

$$A = K(E_{\lambda 1} - E_{\lambda 2}) = K \frac{C_1}{\lambda^5} \left[ \frac{1 - (r_1 r_2)^{\frac{n+1}{2}}}{1 - r_1 r_2} \right] e_1 e_2 \left[ \exp. \frac{-C_2}{\lambda T_1} - \exp. \frac{-C_2}{\lambda T_2} \right]$$

where
$A$ represents the magnitude of signal,
$K$ is a constant which is function of the radiant energy detector sensitivity,
$(E_1 - E_2)$ represents the difference in radiant power between the body whose temperature is being measured and the reflective surface at wavelength $\lambda$,
$C_1$ and $C_2$ represent radiation constants,
$e_1$, $r_1$, $T_1$ represent emittance, reflectance, and temperature respectively of the body whose temperature is being measured,
$e_2$, $r_2$, $T_2$ represent emittance, reflectance, and temperature respectively of the reflective surface, and
$n$ represents the number of points within the confined space emitting radiation which is reflected to the point on which the radiant energy detector is sighted.

When the reflective surface and the body whose temperature is being measured are at the same temperature, the confined space acts as a black body with an emittance of one at which time the alternating current signal will be zero. An Ircon Model 610 Series radiation pyrometer, manufactured by Ircon Inc., modified by the inclusion of a quartz prism, as described, can be employed as the detector means 15.

The output of circuit 27 and the signal of inductor 26 are delivered to a phase sensitive amplifier 28. Amplifier 28 employs the known technique of phase sensitive rectification to convert the AC output of circuit 27 to either a positive or negative DC signal depending on the phase difference between the signal from circuit 27 and the reference signal of inductor 26. When the reflective surface 11 is at a higher temperature than strip 12 and the radiant energy incident from surface 11 is therefore greater than the radiant energy incident from strip 12, the signals from circuit 27 and inductor 26 are 180° out of phase and the DC output of amplifier 28 is negative. Conversely, when the reflective surface 11 is at a lower temperature than strip 12 and the radiant energy incident from surface 11 is therefore less than the energy incident from strip 12, the signals from circuit 27 and inductor 26 are in phase and the DC output of amplifier 28 is positive.

Controller 29 provides an alternating electrical current to transformer 30 which steps up the current and delivers it through lines 31 and 32 to steel sheet 10. The sheet 10 and reflective surface 11 are heated by the electrical current passing through the sheet. The output of amplifier 28 regulates the alternating current output of controller 29. When the output of amplifier 28 is positive, the output of controller 29 is increased and, conversely, when the output of amplifier 28 is negative, the output of controller 29 is decreased. Thus, it will be understood that the difference in radiation incident from reflective surface 11 and substrate 12 as measured by radiant energy detector 15 acts as a reference to control the heating of reflective surface 11. When the temperatures of reflective surface 11 and substrate 12 are the same, the output of detector 15 is zero as is the output of phase sensitive amplifier 28 and, consequently, the output of controller 29 will maintain the output which it has at that time. Accordingly, when the recorder 14 shows that the temperature of steel sheet 10 has leveled off it is recognized that surface 11 and substrate 12 are at the same temperature so that the temperature indicated on the recorder is the temperature of the substrate.

The present invention, by employing a single radiant energy detector rather than two separate detectors (one sighted on the substrate whose temperature is being measured and the other sighted on the reflective surface) eliminates errors in the temperature measurement occasioned by differential drift of the detectors. In addition, in employing two detectors, it is necessary that they be matched to one another to provide accurate temperature measurements.

We claim:

1. Apparatus for measuring the temperature of a substrate including a body having a reflective surface for defining in cooperation with said substrate a confined space which acts as a black body when the body and the substrate are at the same temperature, radiant energy detector means having a single stationary radiation detector for alternately sensing the radiant energy incident from a point on the reflective surface and a point on said substrate within said confined space, a quartz prism mounted on a tuning fork, said tuning fork being so positioned with respect to the paths along which the radiant energies incident from said points on said reflective surface and said substrate pass that upon activation of the tuning fork the prism is alternately outside both paths so as to permit the radiant energy incident from one of said points to fall on said radiation detector and across both paths so as to permit the radiant energy incident from the other of said points to fall on said radiation detector, said radiant energy detector means providing an output measurably responsive to the difference in the radiant energies incident from those two points, means for heating the body, and means for controlling the heating means in response to the output of the radiant energy detector to adjust the temperature of the body to the temperature of the substrate.

2. The apparatus of claim 1 including thermocouple means for measuring the temperature of the body.

* * * * *